(12) United States Patent
Ohtake et al.

(10) Patent No.: US 6,368,392 B1
(45) Date of Patent: Apr. 9, 2002

(54) ELECTRIC DUST COLLECTING UNIT (75) Inventors: Shigemitsu Ohtake, Chiba; Kiyomu Endo, Tokyo, both of (JP)

(73) Assignee: O-Den Corporation, Tokyo (JP)

( * ) Notice: Subject to any disclaimer, the term of this patent is extended or adjusted under 35 U.S.C. 154(b) by 0 days.

(21) Appl. No.: 09/579,144

(22) Filed: May 30, 2000

(30) Foreign Application Priority Data

May 31, 1999 (JP) ............................................ 11-153149

(51) Int. Cl.$^7$ ................................................. B03C 3/45
(52) U.S. Cl. ...................... 96/65; 96/85; 96/97; 96/100
(58) Field of Search ............................. 96/97, 69, 96, 96/98, 67, 85, 100, 65; 55/523, 525, 527, 524, 360; 95/57, 78

(56) References Cited

U.S. PATENT DOCUMENTS

| 2,505,907 A | * | 5/1950 | Meston | 96/97 |
| 2,604,183 A | * | 7/1952 | Richardson | 96/85 |
| 4,056,372 A | * | 11/1977 | Hayashi | 96/97 X |
| 4,265,641 A | * | 5/1981 | Natarajan | 96/97 X |
| 5,055,115 A | * | 10/1991 | Yikai et al. | 96/97 X |
| 5,322,550 A | * | 6/1994 | Park | 96/97 X |
| 5,456,741 A | * | 10/1995 | Takahara et al. | 96/97 X |
| 5,484,473 A | * | 1/1996 | Bontempi | 96/100 X |
| 5,667,563 A | * | 9/1997 | Silva, Jr. | 96/97 X |
| 5,667,564 A | * | 9/1997 | Weinberg | 96/97 X |
| 5,707,429 A | * | 1/1998 | Lewis | 96/97 X |
| 5,925,170 A | | 7/1999 | Nojima | 96/71 |
| 5,928,592 A | | 7/1999 | Nojima | 96/97 X |
| 5,950,424 A | | 9/1999 | Nojima | 95/57 X |
| 5,958,112 A | | 9/1999 | Nojima | 96/55 |
| 6,193,788 B1 | * | 2/2001 | Nojima | 96/100 X |

FOREIGN PATENT DOCUMENTS

| JP | 4-293563 | * | 10/1992 | 96/97 |
| RU | 2008100 | * | 2/1994 | 96/97 |

OTHER PUBLICATIONS

Reference Checked is Patent Based on SN 09/035,999 Which was Cited By Applicants.*
Japanese Office Action dated Dec. 14, 1999, with partial translation.

* cited by examiner

Primary Examiner—Richard L. Chiesa
(74) Attorney, Agent, or Firm—McGinn & Gibb, PLLC (57) ABSTRACT In a disclosed electric dust-collecting unit, needle electrodes face laterally against openings, so that a person in charge of replacement or maintenance/inspection of the electric dust-collecting unit can be prevented in safety from being injured on his fingers or body by needles. Therefore, this type of the electric dust-collecting unit can be applied in an air cleaner not only in offices but also in homes. In addition, this type of the electric dust-collecting unit does not employ a conventional box-pillar type needle support, so that its air flow path is not suppressed with a resultant remarkable decrease in a pressure loss, thus contributing to compacting of the electric dust-collecting unit and hence the air cleaner.

15 Claims, 13 Drawing Sheets

ELECTRIC DUST COLLECTING UNIT

BACKGROUND OF THE INVENTION

1. Field of the Invention

The present invention relates to an electric dust collecting unit suitable for use in an air cleaner, a diesel-engine exhaust black-smoke removing apparatus, a factory oil-mist removing apparatus or a like.

2. Description of the Related Art

With an increasing degree of the air tightness of buildings such as offices, restaurants, recreational facilities, factories, housings or a like, in recent years, cigarette smoke, malodor, and other harmful substances suspended in air are becoming more and more likely to harm health of office workers or others and contaminate facilities and equipment. To guard against this, there has been widely used an electric dust collecting type of an air cleaner installed in offices or like for collecting and removing the malodor of cigarette smoke and suspended particles from indoor air. Of the air cleaners which may come in ceiling-embedded type, wall type, floor type, portable type, and high-table type ones, the high-table type air cleaner is described below as an example.

Figure 11:
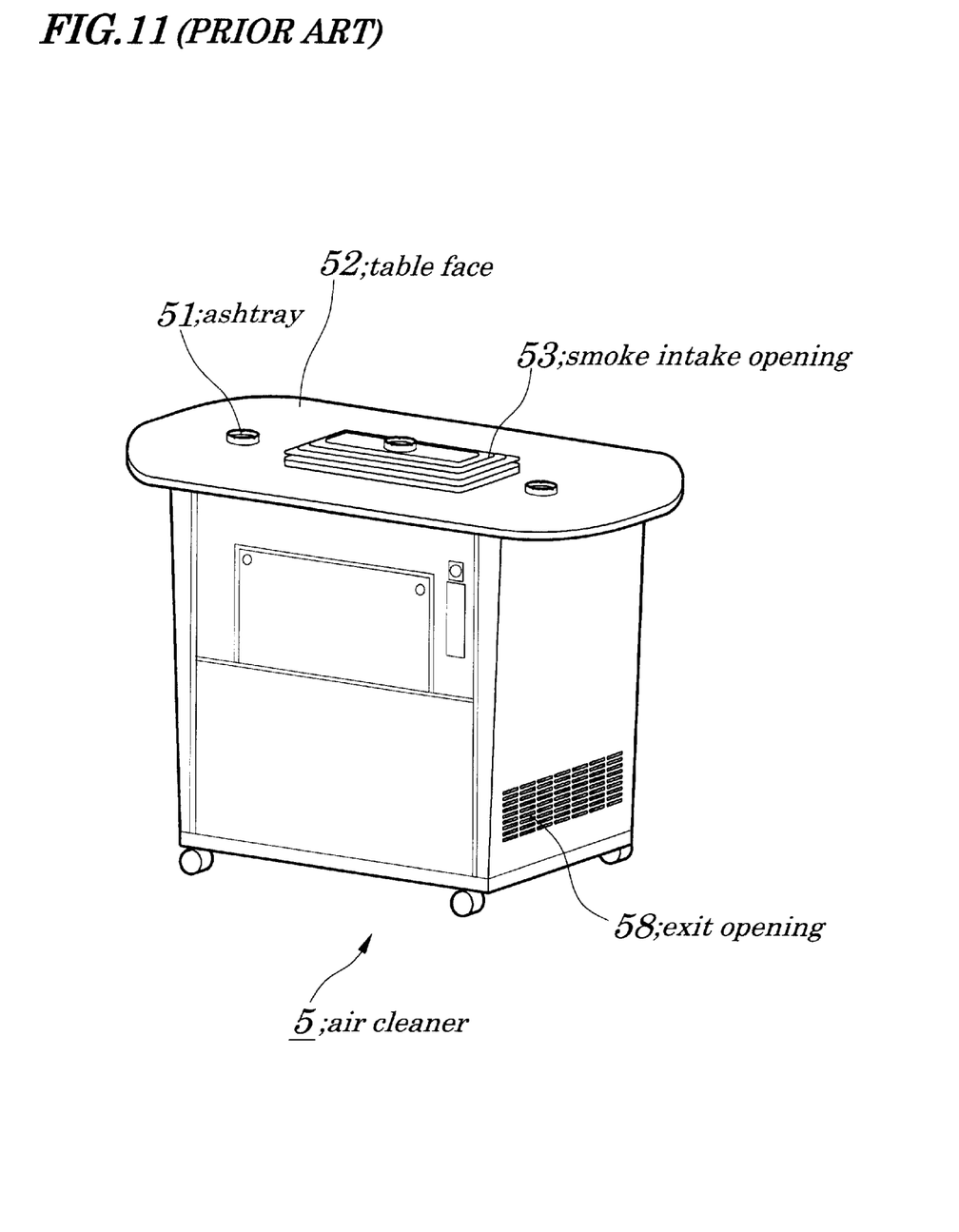
FIG. 11 is a perspective view showing an external configuration of a prior art air cleaner of a high-table type.
Figure 12:
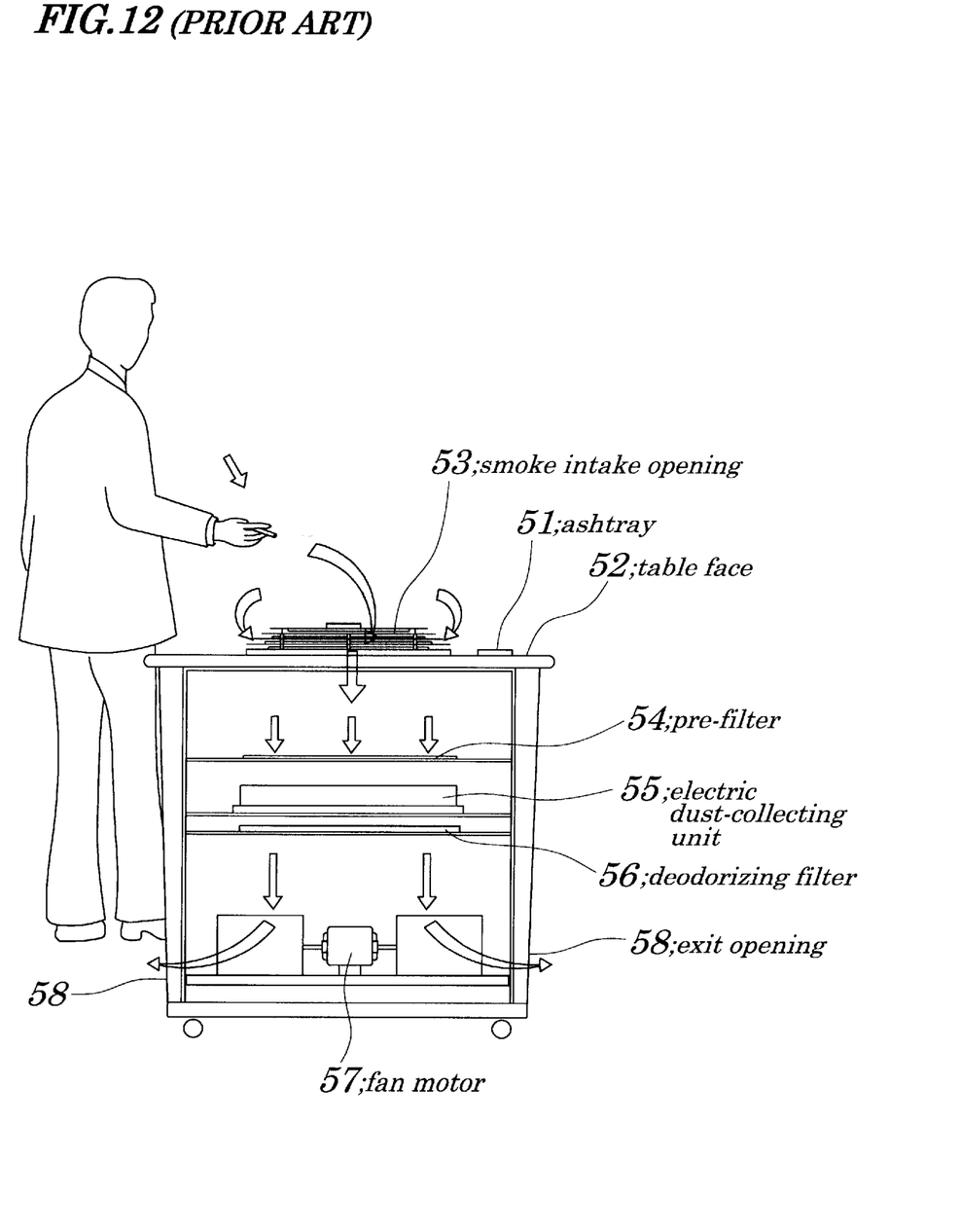
FIG. 12 is a cross-sectional view showing an internal configuration of the air cleaner of FIG. 11.

An air cleaner 5 shown in FIG. 11 and FIG. 12 with a smoking high-table is preferably installed in a waiting room of factories and a lobby of airports or hotels. This air cleaner 5 has an upper face of its own body as a table face 52 which an ashtray 51 or other items are put thereon, approximately at the center of which the table face 52 is provided a smoke intake opening 53. The apparatus body includes therein a pre-filter 54, a needle-discharge type electric dust-collecting unit 55, a deodorizing filter 56 made of active carbon fiber, a fan motor 57, and a power supply (not shown). Exit opening 58 for cleaned air is provided at a lower part on two sides of the apparatus body.

In operation, when the fan motor 57 draws in air containing cigarette smoke through the smoke intake opening 53, first most large smoke particles of thus drawn in cigarette smoke are trapped by the pre-filter 54. Next, small smoke particles are electrostatically collected by the electric dust-collecting unit 55 by corona electric charging. Finally, cigarette odor is absorbed and removed by the deodorizing filter 56. Thus cleaned air is then exhausted by the fan motor 57 again to a room through the exit opening 58 at the lower part. When the electric dust-collecting unit 55, the pre-filter 54, or the deodorizing filter 56 has become dirty, it is taken out through a pull-down type opening/closing door, to be cleaned, recovered, and then attached again for use.

Figure 13:
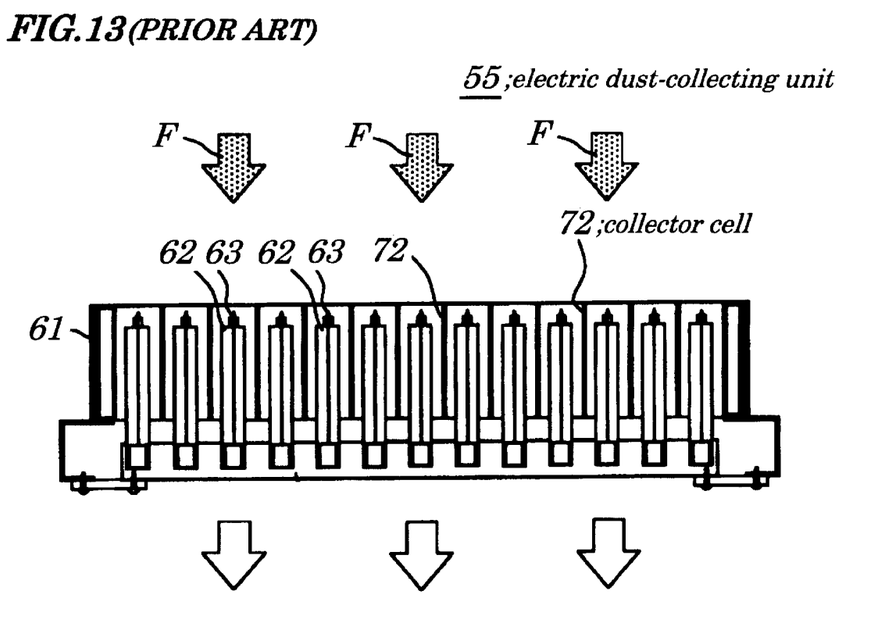
FIG. 13 is a cross-sectional view showing a configuration of the prior art electric dust-collecting unit.
Figure 14:
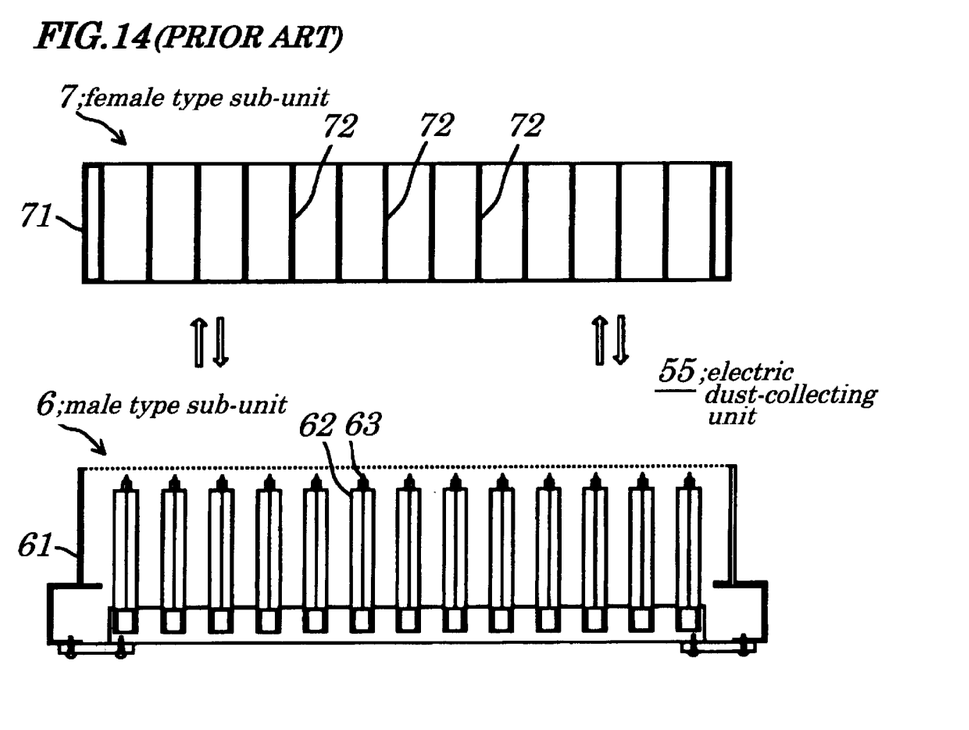
FIG. 14 is a cross-sectional view showing an exploded configuration of the prior art electric dust-collecting unit.

As shown in FIGS. 13 and 14, the conventional electric dust-collecting unit 55 includes a male type sub-unit 6 which has an external-box type frame 61 in which many needle electrodes 63 are arrayed in a lattice against a plurality of rectangular longitudinal electrode supports 62 in a one-to-one relationship and a female type sub-unit 7 which has an internal-box type frame 71 in which many both-end-open angular cylinder shaped collector cells, collecting electrodes 72, are arrayed in a lattice, in such a configuration that both frame 61 and frame 71 are fitted to each other so that the collector cells 72 and the needle electrodes 63 (and the electrode supports 62) maybe correspondingly arranged in a one-to-one relationship, that is, into each of the collector cells 72, each of the needle electrodes 63 (and the electrode supports 62) may be inserted in a non-contact manner. Note here that both the male type sub-unit 6 and the female type sub-unit 7 are detachable for convenience in washing or other.

As shown in FIGS. 13 and 14 again, however, in the above-mentioned conventional electric dust-collecting unit, the needle electrodes 63 are each vertically long and as a whole arranged in parallel to an air flow path F, with their sharp needle tips facing a front opening, so that at a time of replacement or maintenance/inspection of the electric dust-collecting unit 55, a person in charge of work may be injured on his fingers or body by these needles.

In addition, since the prior art needle electrode support 62 is box shaped, it suffers a problem of a larger pressure loss due to a larger resistance against air flow.

SUMMARY OF THE INVENTION

In view of the above, it is an object of the present invention to provide an electric dust-collecting unit capable of performing replacement and maintenance/inspection of a dust-collecting unit thereof in safety and also of reducing pressure loss due to air flow.

According to a first aspect of the present invention, there is provided an electric dust-collecting unit including a plurality of needle electrodes each having a sharp needle tip for charging particles suspended in air by generating corona discharge around the sharp needle tip, collecting electrodes for electrostatically absorbing and collecting suspended particles charged by each the needle electrodes, and plate-shaped deflecting electrodes provided corresponding to the collecting electrodes, for giving the charged suspended particles deflecting force toward the collecting electrodes, in such a configuration that a air flow path for the air is formed between the collecting electrodes and the plate-shaped deflecting electrodes, wherein:

the collecting electrodes have a plurality of cross-sectional U-shaped electrode portions thereof arranged in parallel to each other in an overall cross-sectional comb-teeth shaped configuration; and the plurality of needle electrodes is arranged corresponding to each of the U-shaped electrode portions constituting the collecting electrodes and each has the sharp needle tip thereof attached and fixed to a main face of the plate-shaped deflecting electrodes as projected into a cavity of a corresponding one of the U-shaped electrode portions of the collecting electrodes.

In the foregoing, a preferable mode is one wherein a first one of the collecting electrodes having a plurality of first U-shaped electrode portions and a second one of the collecting electrodes having a plurality of second U-shaped electrode portions are arranged facing each other with a predetermined distance provided therebetween and have the plate-shaped deflecting electrodes interposed between the first collecting electrode and second collecting electrode and also have the air flow path formed between the first collecting electrode and the deflecting electrode as well as between the second collecting electrode and the deflecting electrode;

first ones of the plurality of needle electrodes are arranged corresponding to each of the first U-shaped electrode portions of the first collecting electrode, in such a configuration that each of the first needle electrodes is attached and fixed to a first the main face of the deflecting electrode with the first sharp needle tip thereof as projected into the cavity of the corresponding one of the first U-shaped electrode portions; and second ones of the plurality of needle electrodes are arranged corresponding to each of the second U-shaped electrode portions of the second collecting electrode, in such a configuration that each of the second needle electrodes is attached and fixed to a second the main face (opposite to the first main face) of the deflecting electrode with the sharp needle tip thereof as projected into the cavity of the corresponding one of the second U-shaped electrode portions.

Also, a preferable mode is one wherein the first main face or the second main face of the deflecting electrode has a needle-electrode mounting hole therein for mounting the needle electrode; and each of the needle electrodes includes a needle portion and a body portion and is attached and fixed to the deflecting electrode with the body portion as tightly fitted into the needle-electrode mounting hole.

Also, a preferable mode is one wherein the first main face or the second main face of the deflecting electrode has a needle-electrode mounting hole therein for mounting the needle electrode; and each the needle electrode includes a needle portion, a large-diameter body portion, and a small-diameter read-end step portion and is attached and fixed to the deflecting electrode with the small-diameter rear-end step portion as tightly fitted into the needle-electrode mounting hole.

Also, a preferable mode is one wherein the first main face or the second main face of the deflecting electrode has a plurality of needle-electrode mounting holes therein for mounting the plurality of needle electrodes; and each the needle electrode includes a needle portion, a large-diameter body portion, and a small-diameter rear-end step portion and is attached and fixed to the deflecting electrode with the small-diameter rear-end step portion as inserted from a side of the main face of the deflecting electrode into a corresponding one of the needle-electrode mounting holes and caulked from a side of a face opposite to the main face.

Also, a preferable mode is one wherein the first main face or the second main face of the deflecting electrode has a needle-electrode mounting hole therein for mounting the needle electrode; and the each needle electrode includes a needle portion, a large-diameter body portion, and a small-diameter rear-end step portion and is fixed by use of wax to the deflecting electrode with the small-diameter rear-end step portion as inserted into the needle-electrode mounting hole in the deflecting electrode.

Also, a preferable mode is one wherein the needle electrodes are each attached and fixed to the first main face or the second main face of the deflecting electrode with the sharp needle tip thereof as pointing to a desired position on the collecting electrode on an opposite-side.

Also, a preferable mode is one wherein the collecting electrodes and/or the deflecting electrodes are made of paper or synthetic resin which is coated with metal.

Furthermore, a preferable mode is one wherein the collecting electrodes and/or the deflecting electrodes are made of a stack of paper or synthetic resin and metal foil.

Also, according to a second aspect of the present, there is provided an electric dust-collecting unit including a plurality of needle electrodes each having a sharp needle tip for charging particles suspended in air by generating corona discharge around the sharp needle tips, collecting electrodes for electrostatically absorbing and collecting suspended particles charged by each the needle electrode, and deflecting electrodes provided corresponding to the collecting electrodes, for giving the charged suspended particles deflecting force toward the collecting electrodes, in such a configuration that an air flow path for the air is formed between the collecting electrodes and the deflecting electrodes, wherein:

the collecting electrodes have a plurality of cross-sectional U-shaped electrode portions thereof arranged in parallel to each other in an overall cross-sectional comb-teeth shaped configuration and the deflecting electrodes also have an overall cross-sectional comb-teeth shaped configuration;

each of the comb teeth of the deflecting electrodes is inserted into a corresponding one of the U-shaped electrode portions of the collecting electrodes in a spaced relationship therewith, thus alternately arraying each of the comb teeth of the collecting electrodes and each of the comb teeth of the deflecting electrodes; and each the needle electrode is attached and fixed to the comb teeth of a corresponding one of the deflecting electrodes with the sharp needle tip thereof as projected into a cavity of an arbitrary one of the U-shaped electrodes constituting the collecting electrodes.

In the foregoing second aspect, a preferable mode is one wherein each the needle electrode has a groove portion in a rear-end face thereof and is attached and fixed to the deflecting electrode with the groove portion in the rear-end face as tightly fitted to a tip edge of the comb teeth of the corresponding one of the deflecting electrodes.

Also, a preferable mode is one wherein each the needle electrode includes a needle portion and a body portion and is attached and fixed to the deflecting electrode with a side of the body portion as adhered, in meeting contact, to the first main face or the second main face of the comb teeth of the corresponding one of the deflecting electrodes.

Also, a preferable mode is one wherein each the needle electrode is attached and fixed to the first main face or the second main face of the deflecting electrode with the sharp needle tip thereof as pointing to a desired position of the collecting electrode on an opposite side.

Also, a preferable mode is one wherein the collecting electrodes and/or the deflecting electrodes are made of paper or synthetic resin which is coated with metal.

Furthermore, a preferable mode is one wherein the collecting electrodes and/or the deflecting electrodes are made of a stack of paper or synthetic resin and metal foil.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

The following will describe embodiments of the present invention with reference to the drawings. The description is made specifically using embodiments.

First Embodiment

Figure 1:
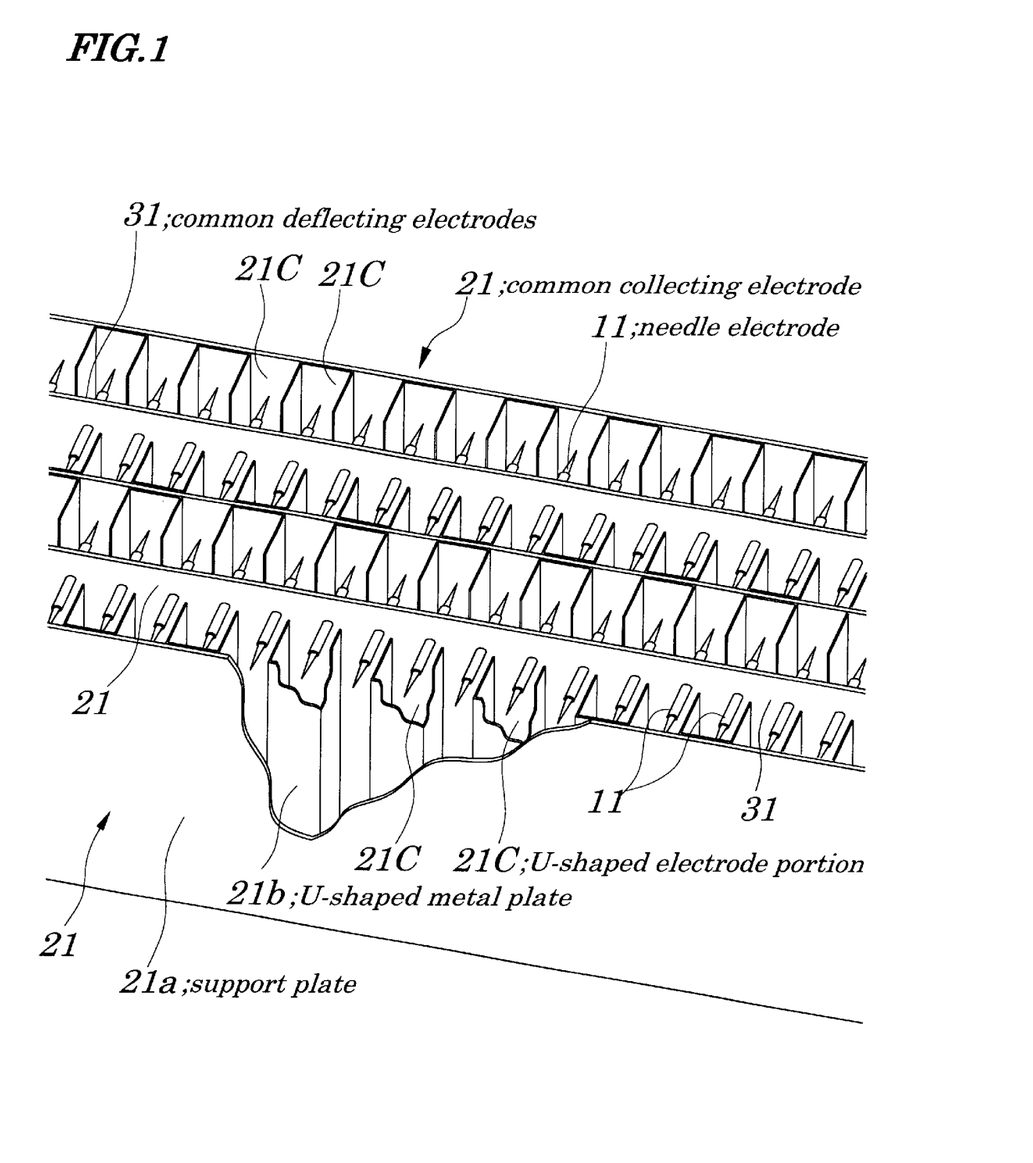
FIG. 1 is a partially broken perspective view showing a partially broken part of an approximate configuration of an electric dust-collecting unit according to a first embodiment of the present invention.
Figure 2:
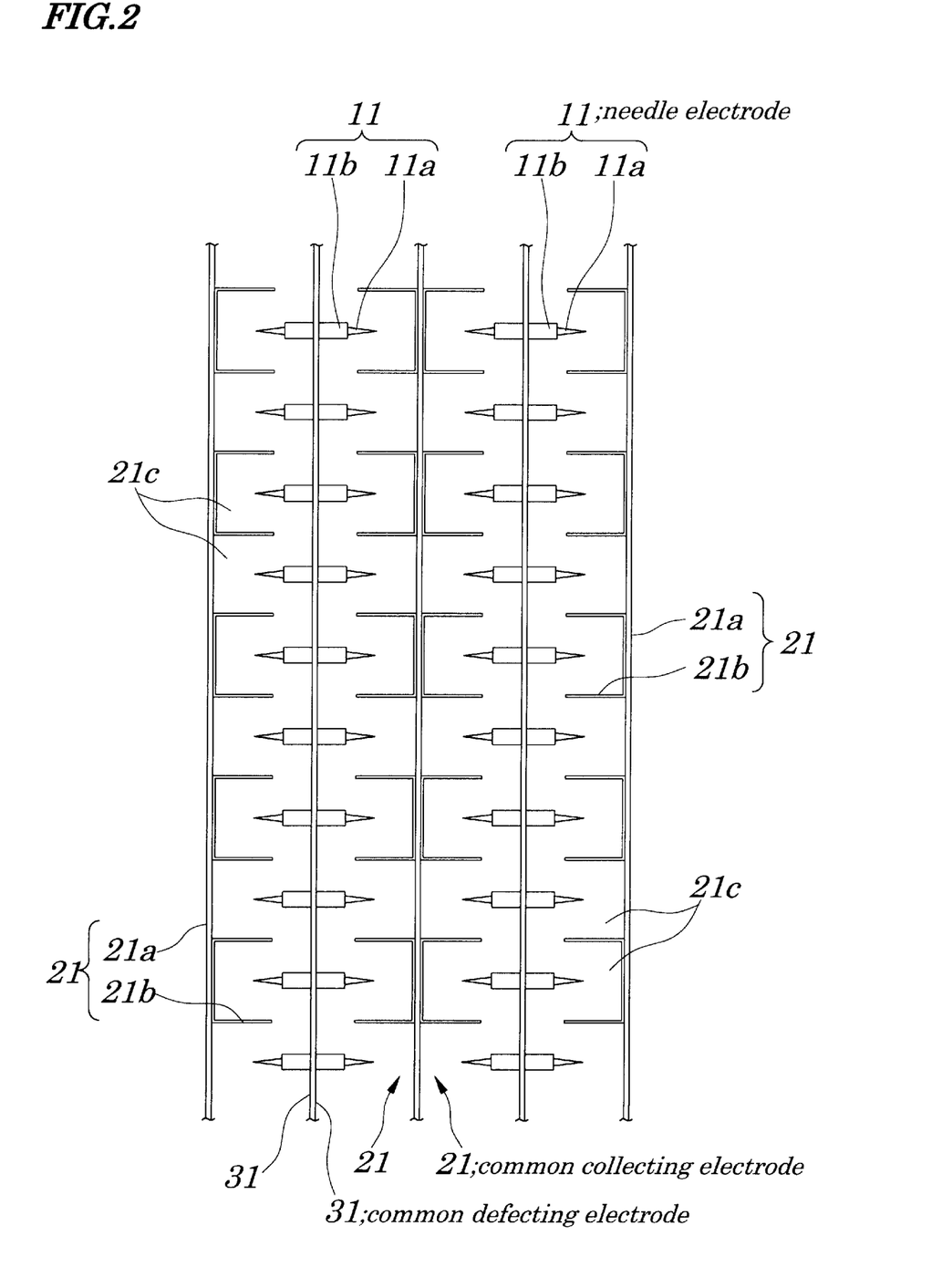
FIG. 2 is a partial plan view showing part of the approximate configuration of the electric dust-collecting unit of FIG. 1.

A dust-collecting unit according to a first embodiment, which is built in and used in various air cleaners such as a ceiling-embedded type air cleaner, a wall type air cleaner, a high-table type air cleaner, and a simple portable type smoke separator (air cleaner), including, as shown in FIGS. 1 and 2, a plurality of needle electrodes 11 for generating corona discharge around sharp needle tips 11a to form an ionizing space area in order to charge particles suspended in air passing by, a plurality of common collecting electrodes 21 for electrostatically absorbing and collecting the suspended particles charged by these needle electrodes 11, a plurality of common deflecting electrodes 31 which are provided in accordance with these common collecting electrodes 21 for giving thus charged suspended particles deflecting force toward the common collecting electrodes 21, and a cabinet (not shown), in such a configuration that a flow path for air to be cleaned may be formed between the pair of the common collecting electrodes 21 and the common deflecting electrodes 31.

Being overall shaped like cross-sectional-comb teeth, the common collecting electrodes 21 have such a configuration that on one side or both sides of elongated metal-sheet support plates 21a, a plurality of U-shaped metal plates 21b is mutually evenly spaced and arrayed parallel to a latitudinal direction of the support plates 21a with their openings facing outside, thus forming cross-sectional-U-shaped electrode portions 21c in a longitudinal direction of the support plates 21a.

In this embodiment, each pair of the common collecting electrodes 21 arranged adjacent to each other inside an unit are integrated in the configuration because the plurality of U-shaped metal plates 21b is arrayed and joined on both sides of each sheet of the support plates 21a, although each pair of mutually adjacent common collecting electrodes 21 may of course be formed separately of each other.

Also, the common deflecting electrodes 31 each are made of an elongated metal plate which has approximately a same size and shape as the support plates 21a constituting the common collecting electrodes 21. In this embodiment, one face of each of the metal plates is adapted to act as one common defecting electrode 31 of the mutually adjacent two common deflecting electrodes 31 and other face, the other common deflecting electrode 31, although these mutually adjacent two common deflecting electrodes 31 may of course be formed separately from each other.

Also, the needle electrodes 11 each includes a stainless-steel made needle tip 11a (needle portion) nickel-plated (to a metal thickness of 2–10 $\mu$m) for preventing oxidation and a cylindrical body portion 11b for supporting the needle tip 11a, in such a configuration that they are arranged against the U-shaped electrode portions 21c in a one-to-one relationship so that the needle tips 11a each may project into the cavity of the corresponding U-shaped electrode portion 21c of the common collecting electrodes 21 and also be fixed with such an adhesive agent as silver wax on both sides of the elongated metal-sheet plate (which correspond to two of the common deflecting electrodes 31) perpendicular to an "opposite-side" common collecting electrodes 21 (a web portion of the support plate 21a or the U-shaped metal plate 21b).

Thus, in the above-mentioned configuration of this embodiment, the needle electrodes 11 face lateral against openings, so that a person in charge of replacement or maintenance/inspection of the dust-collecting unit can be prevented in safety from being injured on his fingers or body by the needle tip 11a.

Therefore, this type of the dust-collecting unit can be applied in an air cleaner not only in offices but also in homes at large.

In addition, this type of the dust-collecting unit does not employ a conventional box pillar type needle support, so that the air flow path is not suppressed with a resultant remarkable decrease in a pressure loss, thus contributing to the compacting of the dust-collecting unit and hence the air cleaner.

Second Embodiment

Figure 4A:
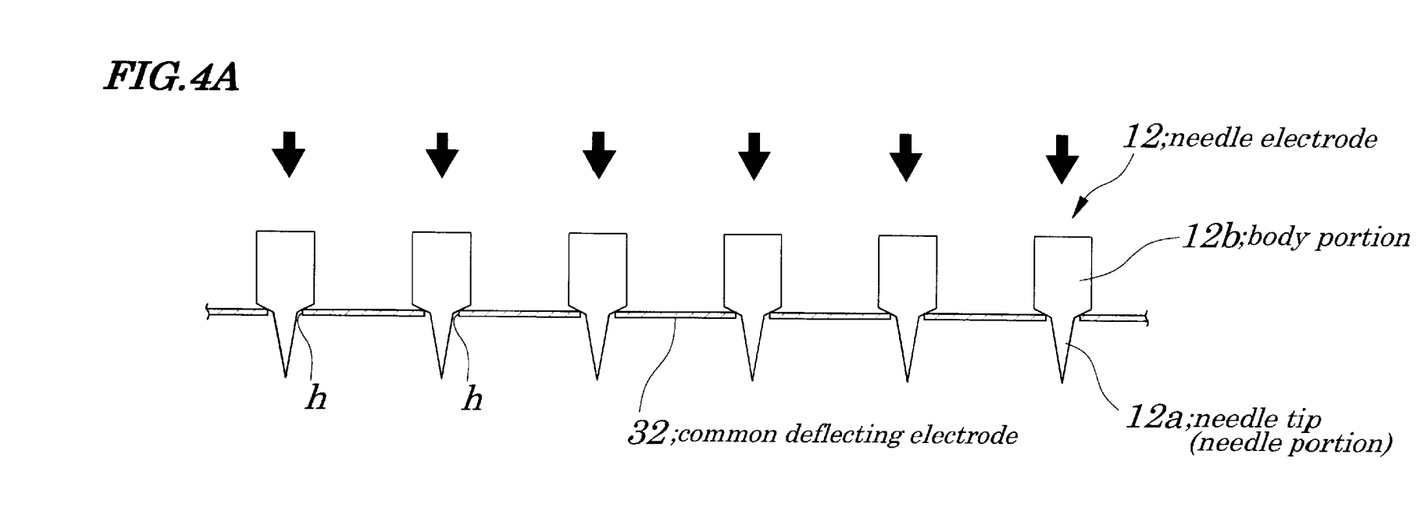
FIGS. 4A and 4B are flow diagrams sequentially explaining steps of a method for attaching the electric dust-collecting unit used in the second embodiment of the present invention.
Figure 4B:
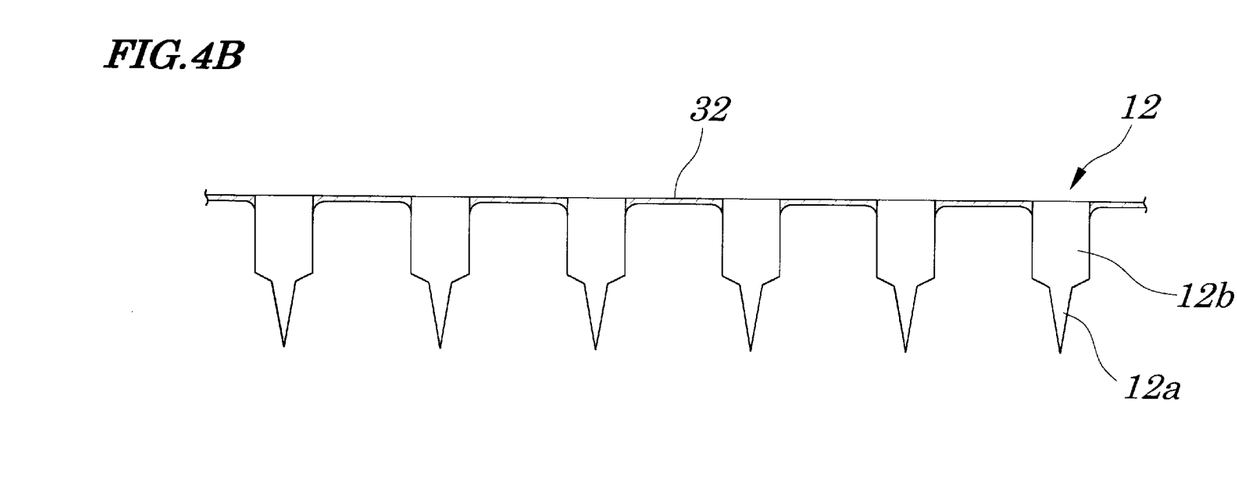

This second embodiment largely differs in configuration from the above-mentioned first embodiment in a respect that as shown in FIG. 4A, a plurality of mounting holes h is punched at a constant spacing beforehand in a main face of common deflecting electrodes 32 for attaching and fixing needle electrodes 12 so that as shown in FIG. 4B the needle electrodes 12 may be fitted and locked in the mounting holes h in the common deflecting electrodes 32 with no aide of an adhesive agent such as silver wax.

In this case, hole diameter of the mounting holes h is set beforehand larger than a maximum diameter of needle tips (needle portion) 12a of the needle electrodes 12 but smaller than a diameter of a body portion 12b.

To attach and fix the needle electrodes 12 to the common deflecting electrodes 32, first, as shown in FIG. 4A, the needle electrodes 12 are inserted from above into the mounting holes h in the common deflecting electrodes 32. In this case, the maximum diameter of the needle portion 12a of each of the needle electrode 12 is smaller than the hole diameter of the mounting hole h, so that the needle portion 12a can easily pass through the mouting hole h but, at a same time, since the body portion 12b is larger than the mounting hole h in diameter, the needle electrode 12 is stopped in the mounting hole h at a tip of its body portion 12b.

Figure 3:
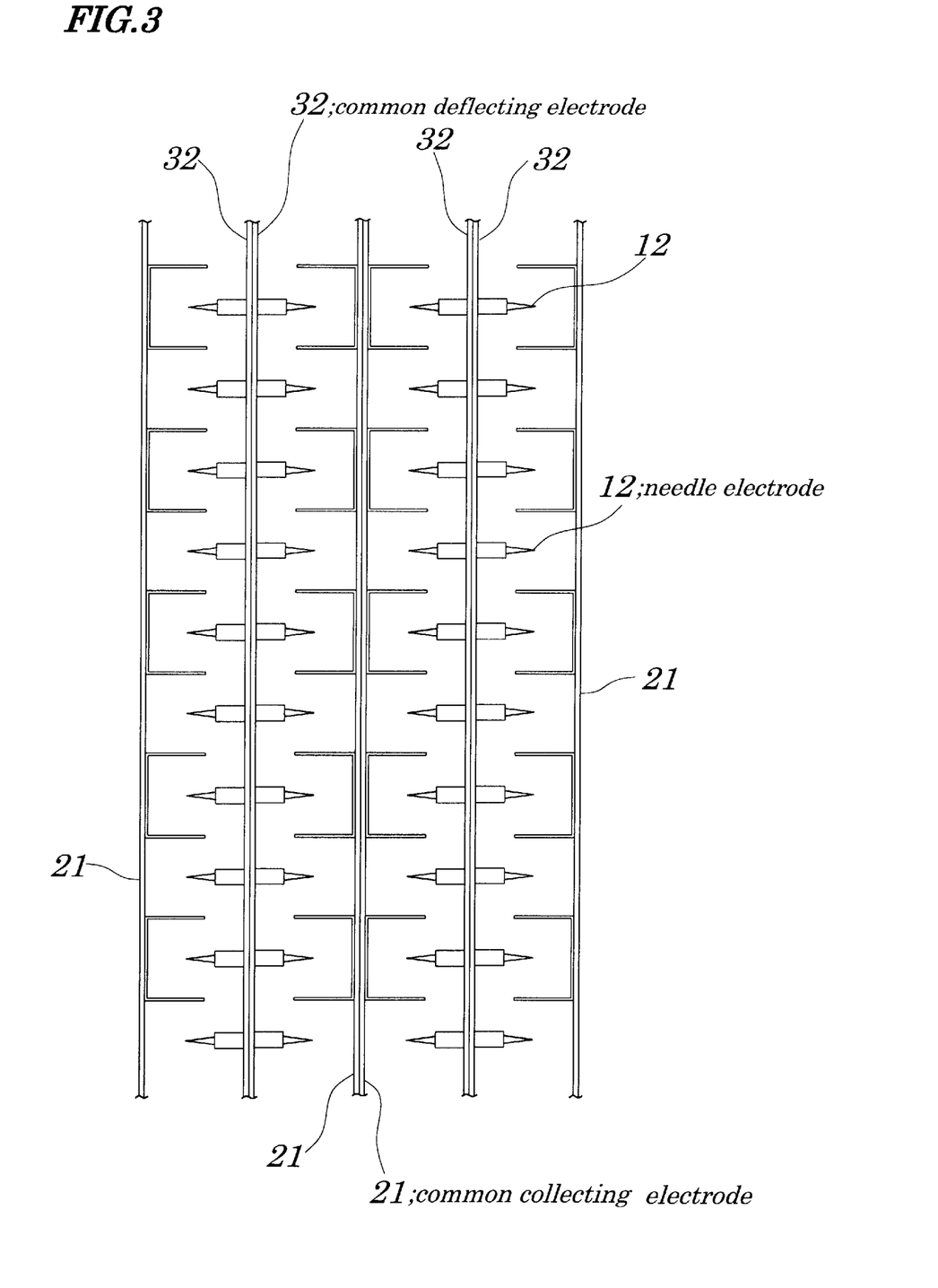
FIG. 3 is a partial plan view showing part of an approximate configuration of an electric dust-collecting unit according to a second embodiment of the present invention.

Next, a striking machine (not shown) such as a hammer is used to strike the rear end face of the body portion 12b of each of the needle electrodes 12 to thereby drive by the large-diameter body portion 12b into the small-diameter mounting hole h. The mounting hole h is elastically deformed by sticking-in of the body portion 12b, to generate elastic restoring force/large frictional force due to this elastic deformation, which in turn causes the body portion 12b of the needle electrode 12 to be fitted and locked tightly in the mounting hole h (see FIG. 4B). Thus, the needle electrode 12 is successfully fitted and locked to the common deflecting electrode 32. In this embodiment, the needle electrodes 12 are attached only to one face of the common deflecting electrodes 32, so that at a time of assembly of a dust-collecting unit, as shown in FIG. 3, mutually adjacent two common deflecting electrodes 32 are built back to back to each other. Since this embodiment is almost a same as the above-mentioned first embodiment except for the above-mentioned respect, its description is omitted here, with same components being indicated by same reference numerals over FIGS. 2 and 3.

As mentioned above, with the above-mentioned configuration according to this second embodiment also, almost same effects can be obtained as those with the above-mentioned first embodiment. In addition, fitting/locking by striking alone rather than joining by use of wax is employed to attach and fix the needle electrodes 12 to the common deflecting electrodes 32, thus remarkably accelerating attaching/fixing of the needle electrodes 12.

Third Embodiment

Figure 5A:
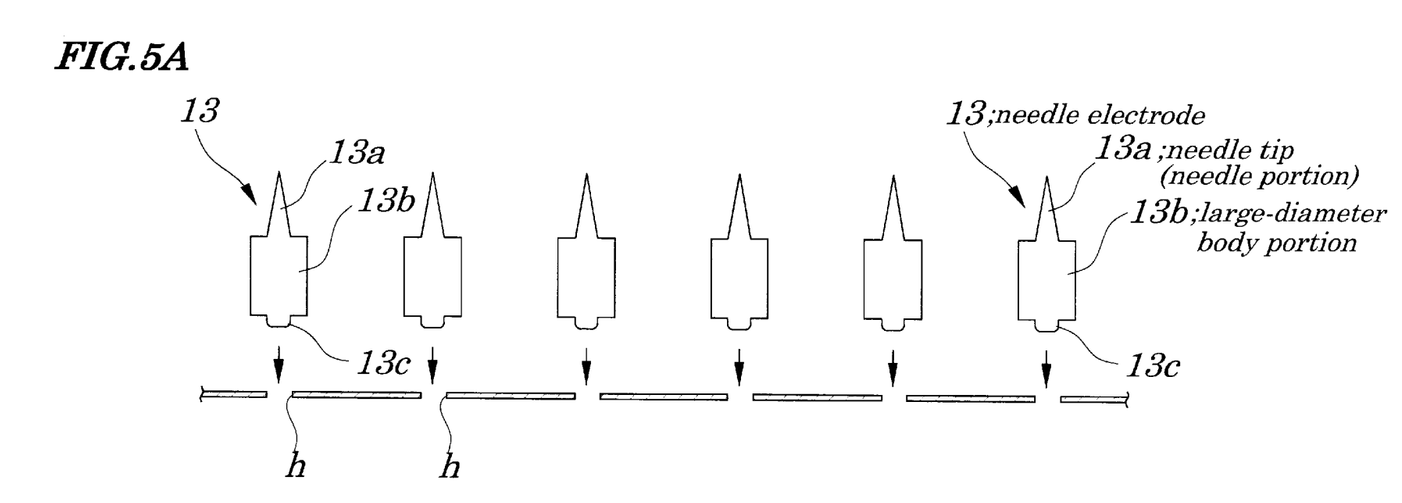
FIGS. 5A and 5B are flow diagrams sequentially explaining steps of a method for attaching needle electrodes used in a third embodiment of the present invention.
Figure 5B:
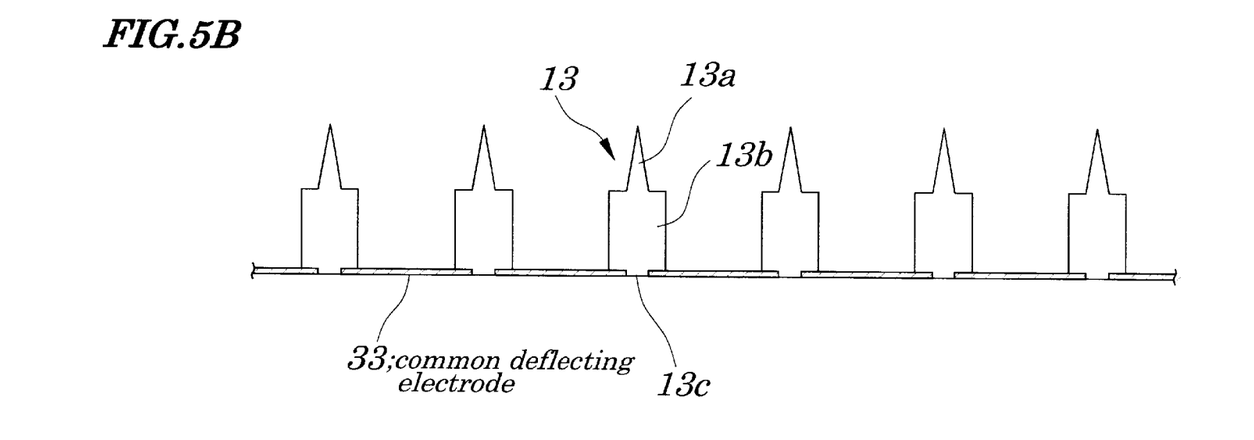

This third embodiment largely differs in configuration from the above-mentioned second embodiment in a respect that as shown in FIG. 5, needle electrodes each include a needle tip (needle portion) 13a, a large-diameter body portion 13b, and a small-diameter rear-end step portion 13c, in such a configuration that this rear-end step portion 13c is fitted tightly into a mounting hole h in a needle electrode 13 and attached and fixed to a common deflecting electrode 33.

In this embodiment, each rear-end step portion 13c of the needle electrode 13 is chamfered at its edge to have round corners. In addition, a hole diameter of the mounting hole h is set beforehand smaller than a maximum diameter of the rear-end step portion 13c of the needle electrode 13 but larger than the diameter of the edge of the rear-end step portion 13c.

To attach and fix the needle electrode 13 to the common deflecting electrode 33, first, as shown in FIG. 5A, the rear-end step portion 13c of the needle electrode 13 is inserted from above into the mounting hole h in the common deflecting electrode 33. In this case, the edge of the rear-end step portion 13c is chamfered beforehand to be smaller than the hole diameter of the mounting hole h, so that the needle electrode 13 is stopped in the mounting hole h in alignment therewith.

Next, a striking machine (not shown) such as a hammer is used to drive the rear-end step portion 13c into the mounting hole h. The mounting hole his elastically deformed due to sticking-in of the rear-end step portion 13c, to resultantly generate elastic restoring force/large frictional force due to this elastic deformation, which in turn causes the rear-end step portion 13c to be tightly fitted and locked into the mounting hole h (see FIG. 5B). Thus, the needle electrodes 13 are successfully attached and fixed to the common deflecting electrodes 33.

With the above-mentioned configuration according to this third embodiment also, almost same effects can be obtained as those with the above-mentioned second embodiment.

Fourth Embodiment

The fourth embodiment largely differs in configuration from the above-mentioned third embodiment in a respect that it employs locking by caulking instead of locking by striking fitting/locking.

Figure 6A:
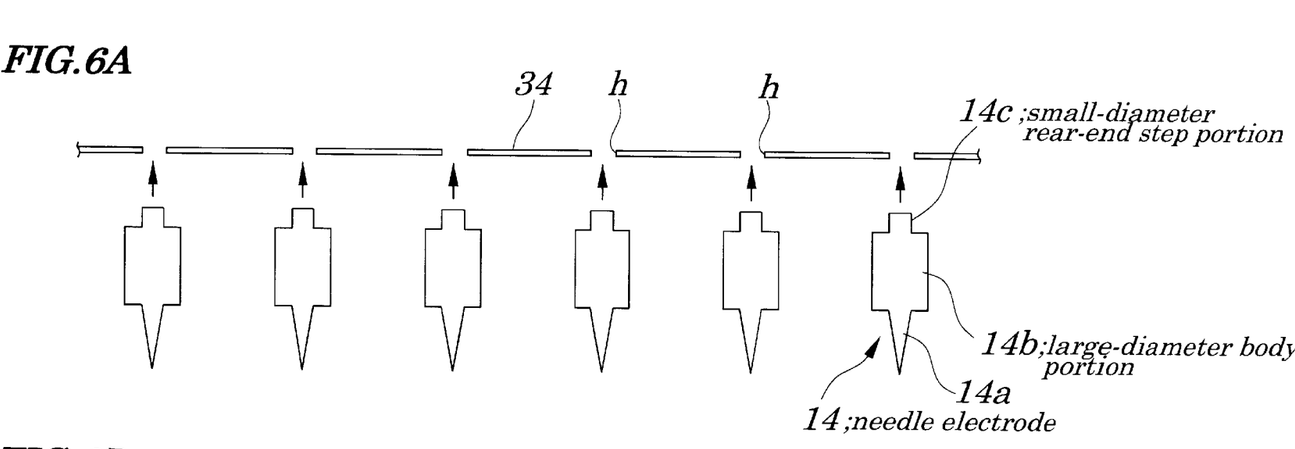
FIGS. 6A and 6B are flow diagrams sequentially explaining steps of a method for attaching needle electrodes used in a fourth embodiment of the present invention.
Figure 6B:
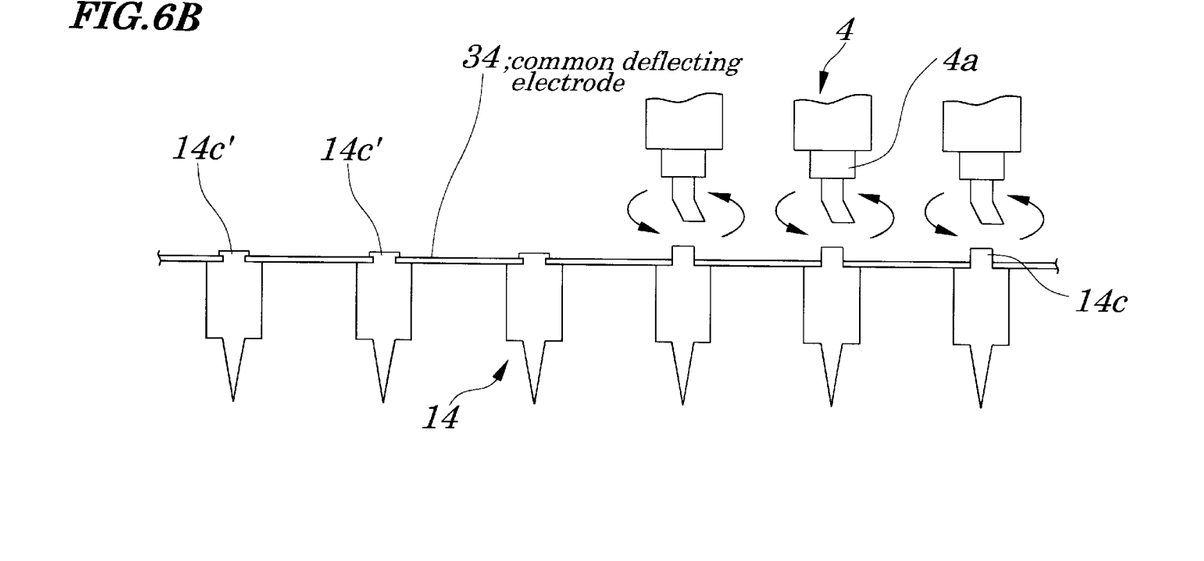

A needle electrode 14 according to this embodiment includes a needle tip (needle portion) 13a, a large-diameter body portion 14b, and a small-diameter rear-end step portion 14c. A hole diameter of a mounting hole h in a common deflecting electrode 34 is set beforehand larger than a diameter of a rear-end step portion 13c of a needle electrode 13.

In this embodiment, to fix the needle electrode 14, first, as shown in FIG. 6A, the rear-end step portion 14c of the needle electrode 14 is inserted into the mounting hole h in the common deflecting electrode 34 and held with a jig (not shown). Next, as shown in FIG. 6B, a de-centering caulking tool 4a provided at a rotary shaft tip of a high-speed de-centering rotation type caulking machine 4 is rotated in a high-speed de-centering manner as is pressed against the rear-end step portion 14c of the needle electrode 14 which has extruded upward from the mounting hole h. During this rotation, large de-centering force is applied to the rear-end step portion 14c of the needle electrode 14, thus caulking the rear-end step portion 14c. After this caulking, as shown to the left in the FIG. 6B, a rear-end step portion 14c' is plastically deformed in a radial direction and integrated with the common deflecting electrode 34, so that the needle electrode 14 cannot be detached any more.

Thus, with the above-mentioned configuration according to this embodiment also, almost same effects can be obtained as those with the first through third embodiments.

In addition, the needle electrode 14 has its root securely caulked to and integrated with the common deflecting electrode 34, thus providing even more secure fixation of the needle electrode 14. It in turn improves mechanical-impact resistance and thermal-impact resistance, thereby enhancing durability and stability in dust-collecting efficiency.

Fifth Embodiment

Figure 7A:
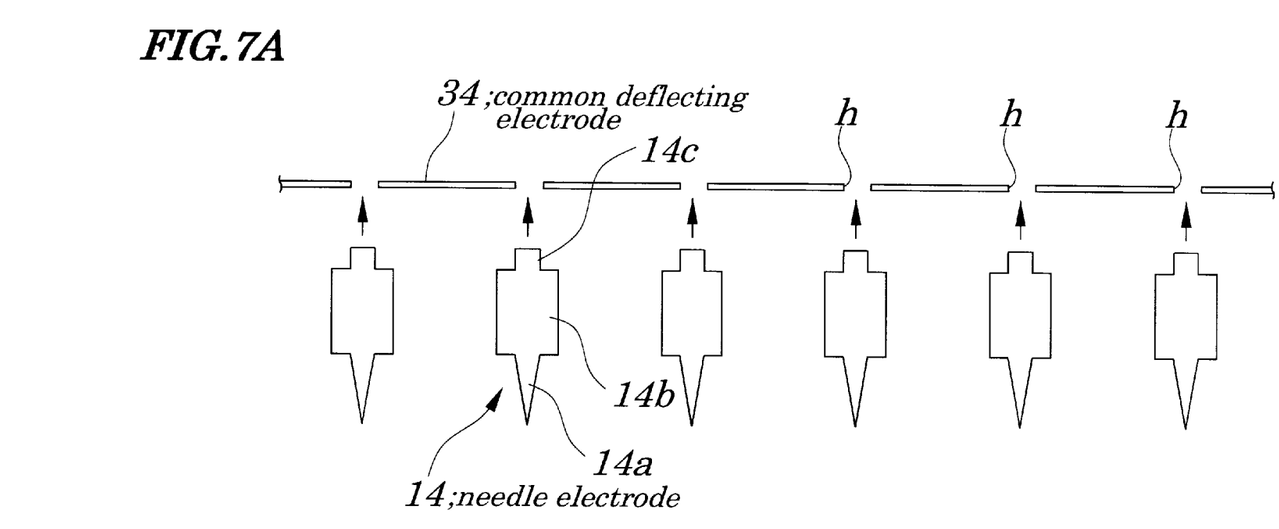
FIGS. 7A and 7B are flow diagrams sequentially explaining steps of a method for needle electrodes used in a fifth embodiment of the present invention.
Figure 7B:
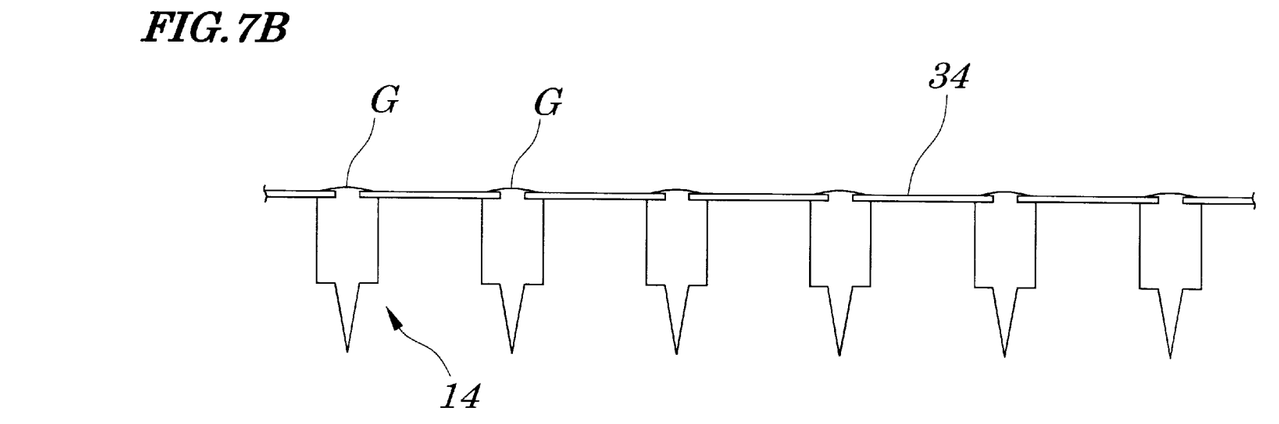

This embodiment largely differs in configuration from the above-mentioned fourth embodiment in a respect that as shown in FIG. 7, it employs fixation by use of silver wax G in place of fixation by caulking. Except in this respect, this embodiment is approximately a same in configuration as the above-mentioned fourth embodiment, so that its description is omitted here, with same components being indicated by same reference numerals over FIGS. 6 and 7.

The above-mentioned configuration provides joining by use of wax for needle electrodes into mounting hole h in a common deflecting electrode in alignment therewith, thus achieving more homogeneous and better qualities in joining than prior art ones.

Sixth Embodiment

Figure 8:
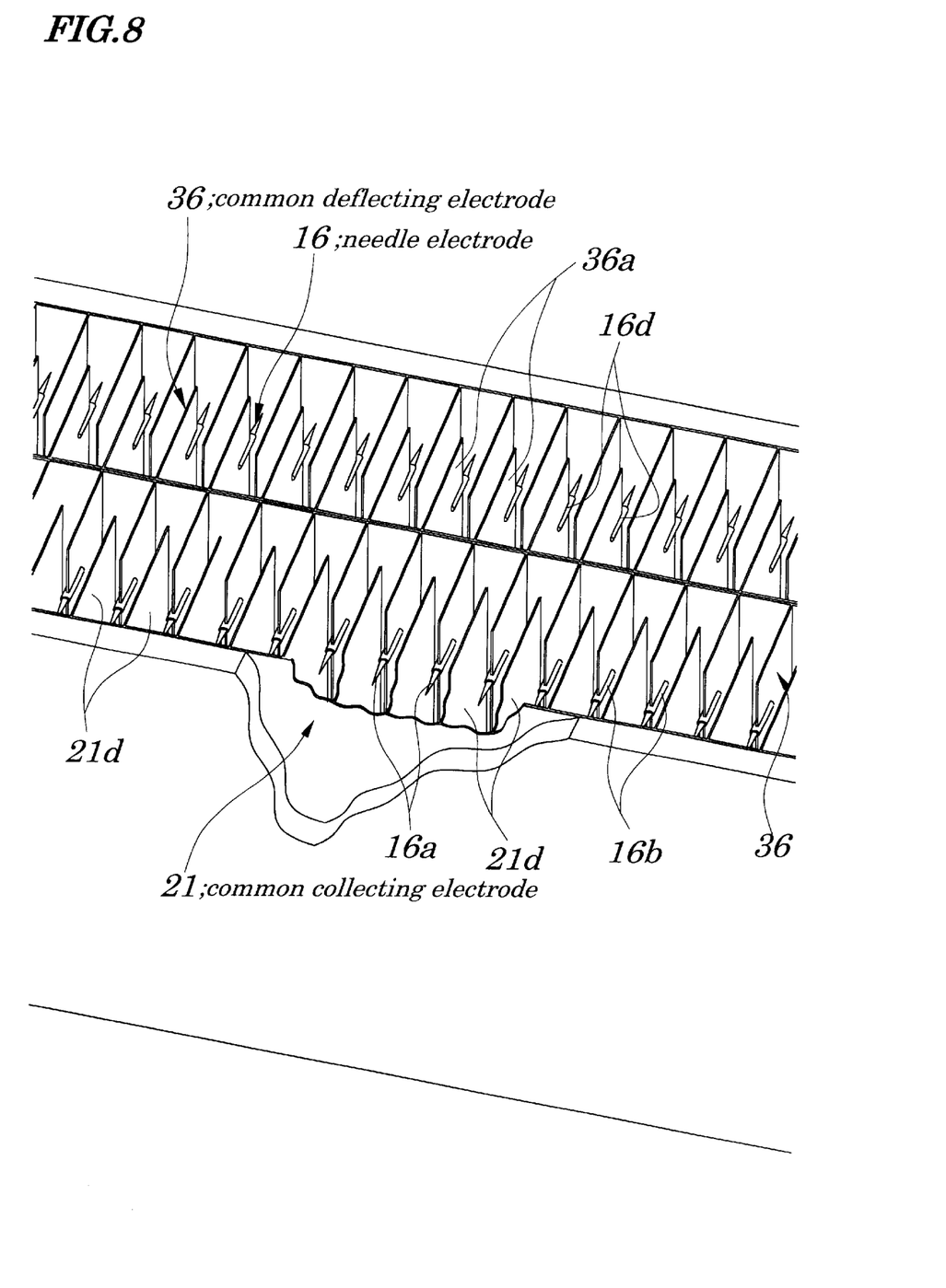
FIG. 8 is a partially broken perspective view showing partially broken part of an approximate configuration of an electric dust-collecting unit according to a sixth embodiment of the present invention.
Figure 9:
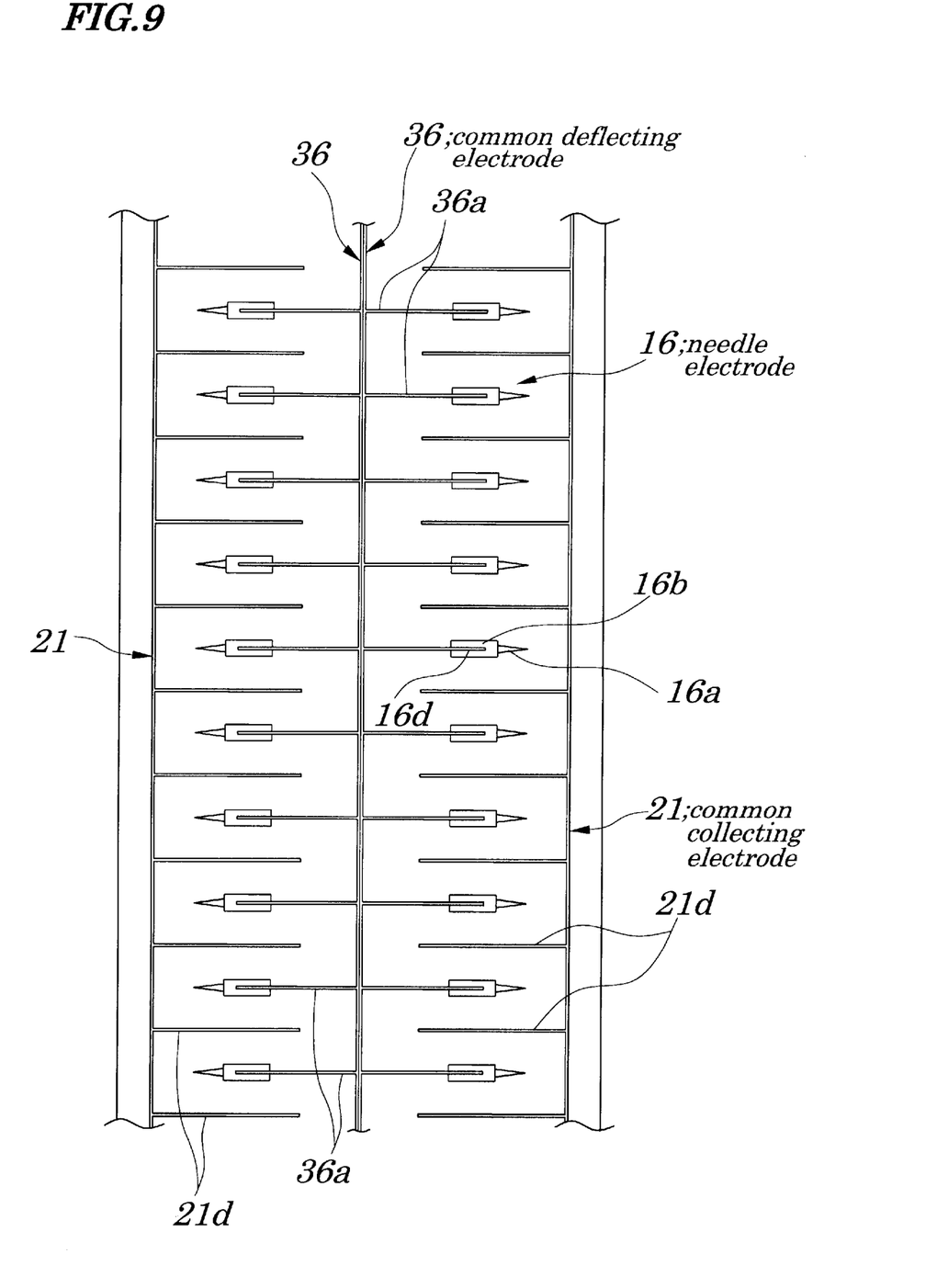
FIG. 9 is a partial plan view showing part of the approximate configuration of the electric dust-collecting unit of FIG. 8.

An electric dust-collecting unit according to this embodiment largely differs from that according to the above-mentioned first through fifth embodiments in that, as shown in FIGS. 8 and 9, in place of sheet-plate shaped common deflecting electrodes 31, 32, 33, and 34, it employs cross-sectional comb-teeth-shaped common deflecting electrodes 36 in an overall manner, that comb teeth 36a of the common deflecting electrode 36 are respectively inserted into corresponding U-shaped electrode portions 21c of common collecting electrode 21 in a spaced relationship therewith, thereby alternately arranging each of comb teeth 21d of the common collecting electrode 21 and each of the comb teeth 36a of the common deflecting electrode 36, and also that in such a state that a groove portion is provided in the read end face of the body portion 16b of each of the needle electrodes 16 and, at a same time, its needle tip 16a is projected into a cavity of the corresponding U-shaped electrode portion 21c of the common collecting electrode 21 and also perpendicular to an opposite-side common collecting electrode 21 (web portion of support plate 21a or U-shaped metal plate 21b), groove portion 16d is tightly fitted to a tip edge of the comb teeth 36a of the common deflecting electrode 36, thereby attaching and fixing the needle electrodes 16 to the common deflecting electrode 36.

With this configuration according to the sixth embodiment also, almost same effects can be obtained as those with the above-mentioned first through fifth embodiments.

Seventh Embodiment

Figure 10:
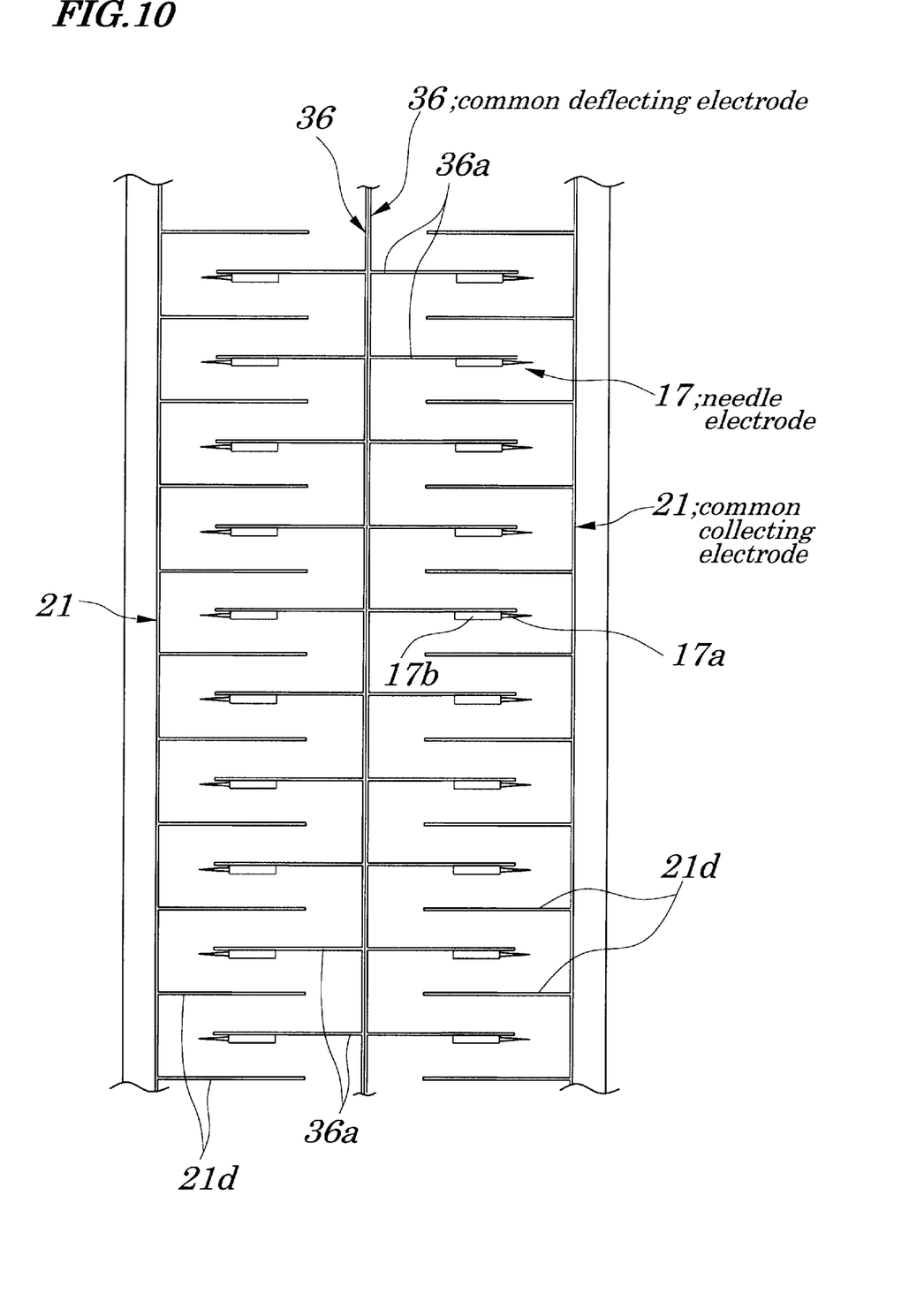
FIG. 10 is a partial plan view showing part of the approximate configuration of the electric dust-collecting unit according to the sixth embodiment of the present invention.

A needle electrode 17 according to this embodiment includes a needle portion 17a and a body portion 17b, in such a configuration that as shown in FIG. 10, it is attached and fixed to a common deflecting electrode 36 with its body portion 17b as adhered to, in meeting contact, to one side (main face) of comb teeth 36a of the common deflecting electrode 36.

With this configuration according to this seventh embodiment also, almost same effects can be obtained as those with the above-mentioned sixth embodiment.

Although the embodiments of the present invention have been detailed with reference to the drawings, specific configuration is not limited these embodiments but any modifications in design may be included in the present invention as far as they do not depart from a gist of the present invention. For example, shape, number, and array of needle electrodes, common deflecting electrodes, common collecting electrode or a like are not limited to those of the above-mentioned embodiments but may be subject to changes as necessary. Also, a caulking machine is not limited to a case where such a high-speed de-centering rotation type caulking machine as used in the above-mentioned embodiments is employed.

The present invention relates to an electric dust collecting unit suitable for use in an air cleaner, a diesel-engine exhaust black-smoke removing apparatus, a factory oil-mist removing apparatus or a like.

Also, the electric dust-collecting unit according to the present invention can be applied not only in an air cleaner but also in an exhaust black-smoke removing apparatus, an oil-mist removing apparatus, an electric dust collecting unit or a like.

Further also, materials for the collecting electrode and/or the deflecting electrode are not limited to the metal plate but may include a synthetic resin coated with metal or a stack of paper or synthetic resin and metal foil. With this, the present invention can be made lighter and more inexpensive, thus facilitating disposal applications (abolition).

As mentioned above, according to the configuration of the present invention, the needle electrodes face laterally against the openings, so that the person in charge of replacement or maintenance/inspection of the dust-collecting unit can be prevented in safety from being injured on his fingers or body by the needle.

Therefore, this type of the dust-collecting unit can be applied in an air cleaner not only in offices but also in homes at large.

In addition, this type of the unit does not employ a conventional box pillar type needle support, so that the air flow path is not suppressed with a resultant remarkable decrease in a pressure loss, thus contributing to the compacting of the dust-collecting unit and hence the air cleaner.

Finally, the present application claims the priority of Japanese Patent Application No. Hei11-153149 filed on May 31, 1999, which is herein incorporated by reference.

What is claimed is:

1. An electric dust-collecting unit comprising a plurality of needle electrodes each having a sharp needle tip for charging particles suspended in air by generating corona discharge around said sharp needle tip, collecting electrodes for electrostatically absorbing and collecting suspended particles charged by each said needle electrodes, and plate-shaped deflecting electrodes provided corresponding to said collecting electrodes, for giving said charged suspended particles deflecting force toward said collecting electrodes, in such a configuration that a air flow path for said air is formed between said collecting electrodes and said plate-shaped deflecting electrodes, wherein:

said collecting electrodes have a plurality of cross-sectional U-shaped electrode portions thereof arranged in parallel to each other in an overall cross-sectional comb-teeth shaped configuration; and said plurality of needle electrodes is arranged corresponding to each of said U-shaped electrode portions constituting said collecting electrodes and each has said sharp needle tip thereof attached and fixed to a main face of said plate-shaped deflecting electrodes as projected into a cavity of a corresponding one of said U-shaped electrode portions of said collecting electrodes.

2. The electric dust-collecting unit according to claim 1, wherein a first one of said collecting electrodes having a plurality of first U-shaped electrode portions and a second one of said collecting electrodes having a plurality of second U-shaped electrode portions are arranged facing each other with a predetermined distance provided therebetween and have said plate-shaped deflecting electrodes interposed between said first collecting electrode and said second collecting electrode and also have said air flow path formed between said first collecting electrode and said deflecting electrode as well as between said second collecting electrode and said deflecting electrode;

first ones of said plurality of needle electrodes are arranged corresponding to each of said first U-shaped electrode portions of said first collecting electrode, in such a configuration that each of said first needle electrodes is attached and fixed to a first said main face of said deflecting electrode with said first sharp needle tip thereof as projected into said cavity of said corresponding one of said first U-shaped electrode portions; and second ones of said plurality of needle electrodes are arranged corresponding to each of said second U-shaped electrodes portions of said second collecting electrode, in such a configuration that each of said second needle electrodes is attached and fixed to a second said main face of said deflecting electrode with said sharp needle tip thereof as projected into said cavity of said corresponding one of said second U-shaped electrode portions.

3. The electric dust-collecting unit according to claim 1, wherein a first said main face or a second said main face of said deflecting electrode has a needle-electrode mounting hole therein for mounting said needle electrode; and each of said needle electrodes comprises a needle portion and a body portion and is attached and fixed to said deflecting electrode with said body portion as tightly fitted into said needle-electrode mounting hole.

4. The electric dust-collecting unit according to claim 1, wherein
a first said main face or a second said main face of said deflecting electrode has a needle-electrode mounting hole therein for mounting said needle electrode; and
each of said needle electrode comprises a needle portion, a large-diameter body portion, and a small-diameter rear-end step portion and is attached and fixed to said deflecting electrode with said small-diameter rear-end step portion as tightly fitted into said needle-electrode mounting hole.

5. The electric dust-collecting unit according to claim 1, wherein
a first said main face or a second said main face of said deflecting electrode has a plurality of needle-electrode mounting holes therein for mounting said plurality of needle electrodes; and
each said needle electrode comprises a needle portion, a large-diameter body portion, and a small-diameter rear-end step portion and is attached and fixed to said deflecting electrode with said small-diameter rear-end step portion as inserted from a side of said main face of said deflecting electrode into a corresponding one of said needle-electrode mounting holes and caulked from a side of a face opposite to said main face.

6. The electric dust-collecting unit according to claim 1, wherein
a first said main face or a second said main face of said deflecting electrode has a needle-electrode mounting hole therein for mounting said needle electrode; and
said each needle electrode comprises a needle portion, a large-diameter body portion, and a small-diameter rear-end step portion and is fixed by use of wax to said deflecting electrode with said small-diameter rear-end step portion as inserted into said needle-electrode mounting hole in said deflecting electrode.

7. The electric dust-collecting unit according to claim 1, wherein said needle electrodes are each attached and fixed to a first said main face or a second said main face of said deflecting electrode with said sharp needle tip thereof as pointing to a desired position on said collecting electrode on an opposite-side.

8. The electric dust-collecting unit according to claim 1, wherein said collecting electrodes and/or said deflecting electrodes are made of paper or synthetic resin which is coated with metal.

9. The electric dust-collecting unit according to claim 1, wherein said collecting electrodes and/or said deflecting electrodes are made of a stack of paper or synthetic resin and metal foil.

10. An electric dust-collecting unit comprising a plurality of needle electrodes each having a sharp needle tip for charging particles suspended in air by generating corona discharge around said sharp needle tips, collecting electrodes for electrostatically absorbing and collecting suspended particles charged by each said needle electrode, and deflecting electrodes provided corresponding to said collecting electrodes, for giving said charged suspended particles deflecting force toward said collecting electrodes, in such a configuration that an air flow path for said air is formed between said collecting electrodes and said deflecting electrodes, wherein:
said collecting electrodes have a plurality of cross-sectional U-shaped electrode portions thereof arranged in parallel to each other in an overall cross-sectional comb-teeth shaped configuration and said deflecting electrodes also have an overall cross-sectional comb-teeth shaped configuration;
each of said comb teeth of said deflecting electrodes is inserted into a corresponding one of said U-shaped electrode portions of said collecting electrodes in a spaced relationship therewith, thus alternately arraying each of said comb teeth of said collecting electrodes and each of said comb teeth of said deflecting electrodes; and
each said needle electrode is attached and fixed to said comb teeth of a corresponding one of said deflecting electrodes with said sharp needle tip thereof as projected into a cavity of an arbitrary one of said U-shaped electrodes constituting said collecting electrodes.

11. The electric dust-collecting unit according to claim wherein each said needle electrode has a groove portion in a rear-end face thereof and is attached and fixed to said deflecting electrode with said groove portion in said rear-end face as tightly fitted to a tip edge of said comb teeth of said corresponding one of said deflecting electrodes.

12. The electric dust-collecting unit according to claim 10, wherein each said needle electrode comprises a needle portion and a body portion and is attached and fixed to said deflecting electrode with a side of said body portion as adhered, in meeting contact, to a first main face or a second main face of said comb teeth of said corresponding one of said deflecting electrodes.

13. The electric dust-collecting unit according to claim 10, wherein each said needle electrode is attached and fixed to a first main face or a second main face of said deflecting electrode with said sharp needle tip thereof as pointing to a desired position of said collecting electrode on an opposite side.

14. The electric dust-collecting unit according to claim 10, wherein said collecting electrodes and/or said deflecting electrodes are made of paper or synthetic resin which is coated with metal.

15. The electric dust-collecting unit according to of claims 10, wherein said collecting electrodes and/or said deflecting electrodes are made of a stack of paper or synthetic resin and metal foil.

* * * * *